United States Patent Office 3,555,670
Patented Jan. 19, 1971

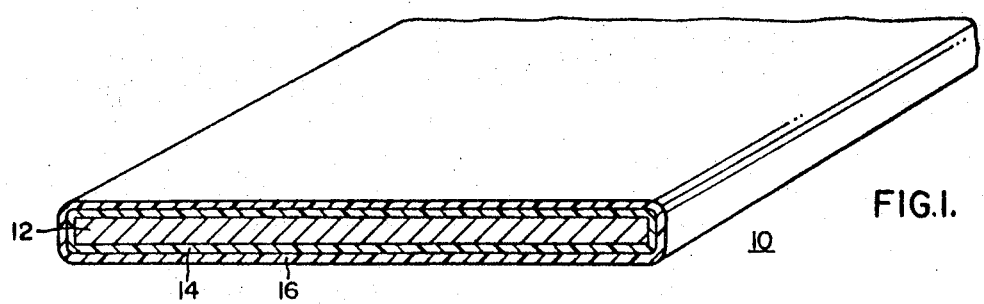
FIG.1.
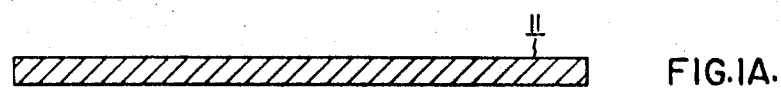
FIG.1A.
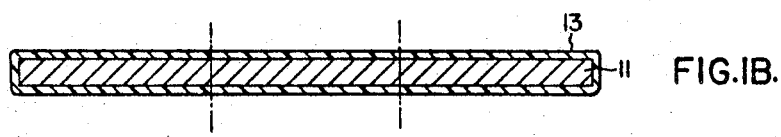
FIG.1B.
FIG.1C.
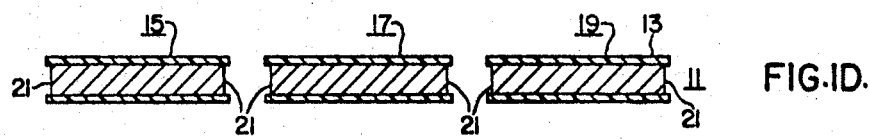
FIG.1D.
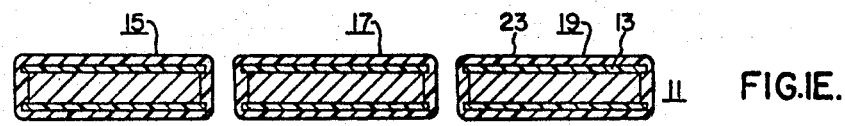
FIG.1E.
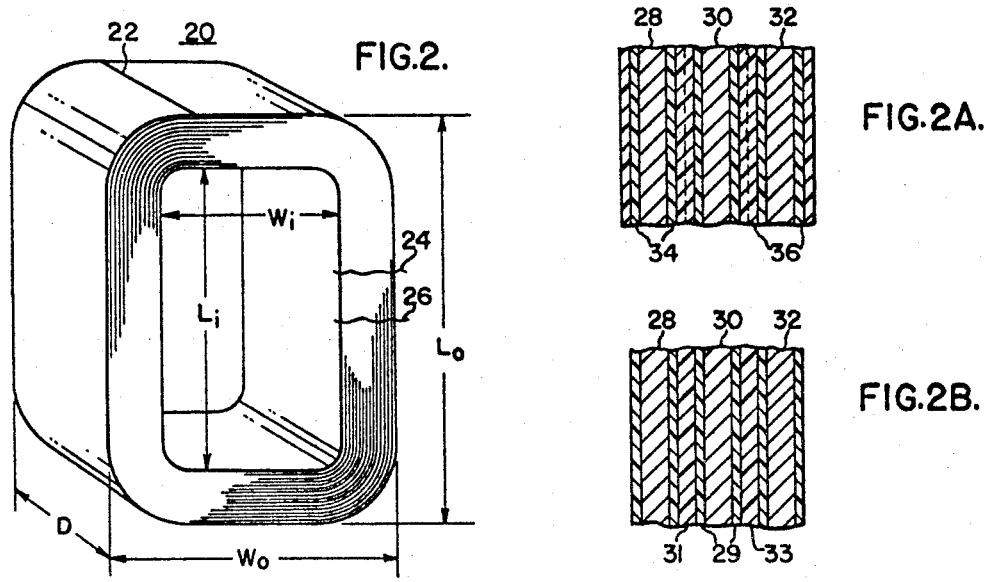
FIG.2.
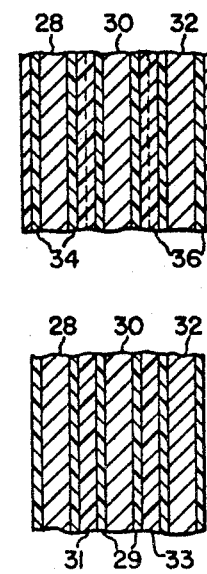
FIG.2A.
FIG.2B.

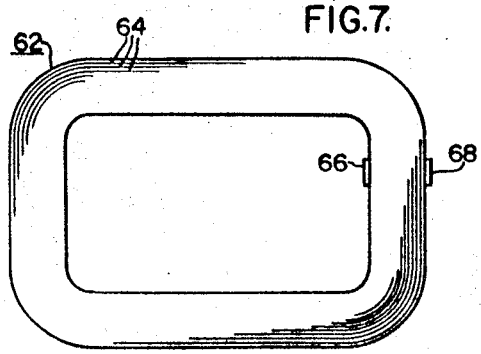
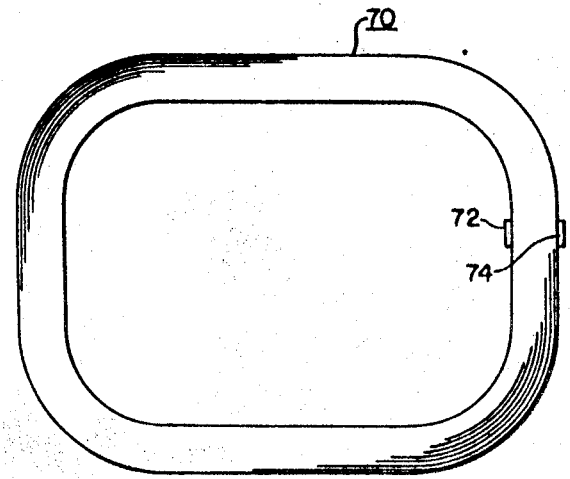
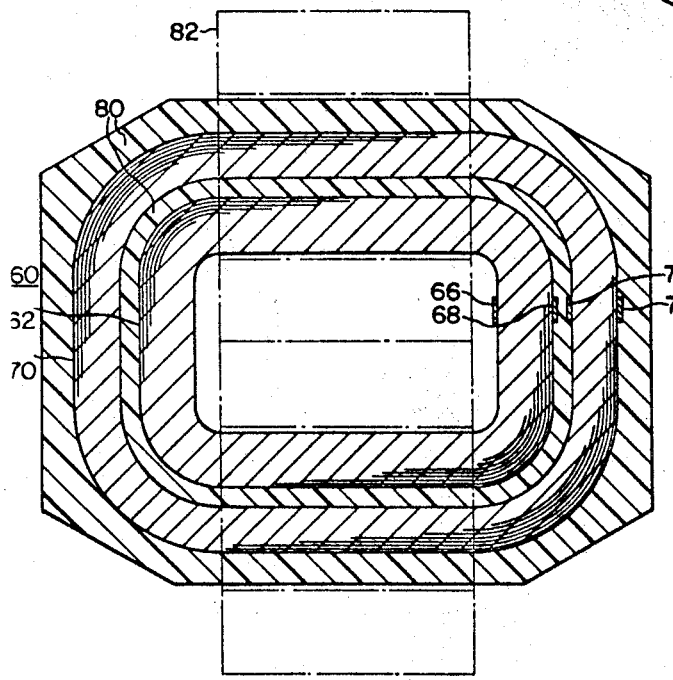
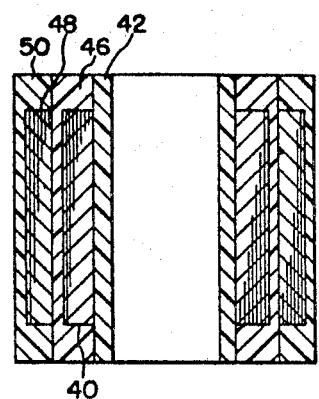
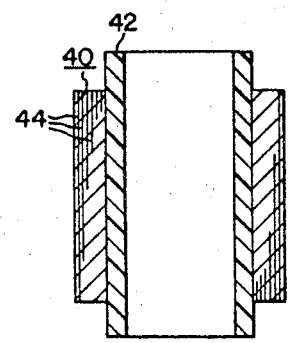
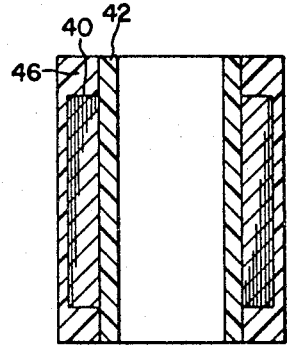
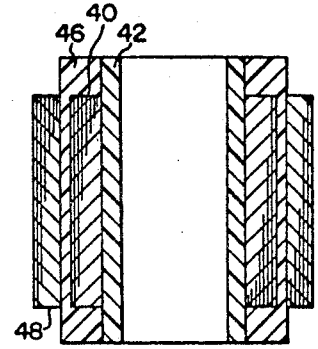

3,555,670
METHODS OF CONSTRUCTING ELECTRICAL TRANSFORMERS
Frank R. Zickar, Sharon, and Paul Voytik, Sharpsville, Pa., assignors to Westinghouse Electric Corporation, Pittsburgh, Pa., a corporation of Pennsylvania
Original application Nov. 4, 1965, Ser. No. 506,350. Divided and this application Sept. 21, 1967, Ser. No. 669,549
Int. Cl. H01f 7/06
U.S. Cl. 29—605    8 Claims

ABSTRACT OF THE DISCLOSURE

Methods of constructing electrical transformers having coils formed of electrically conductive strip or foil, and encapsulated in a cast solid insulation system. The strip or foil is coated with an adhesive prior to winding the coils, and the adhesive is set prior to encapsulation of the coils, to stabilize their dimensions.

CROSS-REFERENCE TO RELATED APPLICATION

This is a division of application Ser. No. 506,350, filed Nov. 4, 1965, now abandoned.

BACKGROUND OF THE INVENTION

(1) Field of the invention

This invention relates in general to windings for electrical inductive apparatus, such as transformers, and more particularly to electrical windings of the foil-wound type which are cast in solid insulation.

(2) Description of the prior art

Electrical inductive apparatus having foil-wound windings cast in solid insulation has many advantages over prior art wire wound windings, whether of the dry or fluid cooled type. Cast solid insulation greatly reduces the size of dry type transformers, compared with conventional dry type transformers which use air and discrete or discontinuous solid insulating members, due to the superior insulating qualities of cast resinous insulation systems compared with air, and due to the manner in which cast solid insulation completely encapsulates the windings, providing continuous insulation around the windings with no edges or surfaces which are subject to creep failure. The cast solid insulation is always stressed in puncture, which is desirable, as the resistance of most solid insulation systems is far greater in puncture than in creep.

Further, the cast solid insulation systems provide the complete electrical insulation required by the windings. Thus, in cast solid liquid cooled transformers, the coolant may be selected primarily for its cooling characteristics without regard to its electrical insulating qualities.

The foil or sheet conductors make it easier to uniformly impregnate the winding with solid insulation as there are few voids which must be filled, compared with conventional wire type windings. Further, in foil wound windings, layer insulation is completely eliminated. Since the difference in potential between adjacent turns is only the relatively low turn-to-turn potential, the turn insulation may be provided by a thin coating of electrical insulation on the foil, or a thin sheet of insulation disposed between the windings. The absence of the layer-to-layer stresses found in wire wound windings eliminates the normal layer insulation, increases the winding space factor, reduces the possibility of corona, and makes the degree of impregnation of the windings by the cast solid insulation less critical. Also, the fact that the winding potential does not vary across the width of the foil, or axial length of the winding, allows metallic cooling ducts to be used if desired. Metallic cooling ducts may be disposed against the sheet or foil, therefore aiding in the transfer of heat from the windings to the cooling medium in the ducts.

Casting foil windings in solid insulation, however, presents many problems which must be solved if the winding is to perform satisfactorily over the expected life of the apparatus. The most serious problem is in preventing cracking of the solid insulation system. The cast solid insulation system must have superior physical properties at elevated temperatures, high thermal conductivity, a low coefficient of thermal expansion which substantially matches that of the foil conductor, and excellent crack resistant characteristics. The selection of the cast insulation system is thus very important, and copending application Ser. No. 456,038, filed May 6, 1965, now abandoned, and assigned to the same assignee as the present application, discloses resinous formulations which have been found to be excellent for capsulating foil wound windings.

Another difficulty arises when capsulating foil wound windings in cast solid insulation systems, which even a cast insulation system having the above-mentioned desirable characteristics may be unable to cope with. This difficulty is the growth of the foil winding or windings during preheat, casting, the B-stage of the casting insulation, and curing operations. In many instances, cracking of the finished cast winding is directly attributable to growth of the foil and, therefore, increase in the winding dimensions. Extensive preheating cycles to stabilize coil growth before encapsulating the windings in the cast solid insulation are costly, because of the relatively long time required; further, preheating cycles are not entirely successful in stabilizing the coil dimensions. The foil of which the coil is wound continues to grow, even after preheating cycles of 16 hours and longer. Thus, in order to achieve a satisfactory coil or winding cast in solid insulation, it would be desirable to stabilize the coil dimensions before the casting operation, and it would be desirable to do so without resorting to excessively long preheating cycles or other costly procedures.

SUMMARY OF THE INVENTION

Briefly, the present invention relates to new and improved methods of constructing encapsulated foil wound transformers, which include the step of applying a thin coating of adhesive means to one or both sides of the foil or sheet conductor. This may be done as the winding or coil is being formed, or in the event that the foil has a coating of electrical insulating means disposed thereon, the adhesive means may be applied at the time of coating the foil with the insulation means, as a substitute for the last coating operation of the electrical insulating means. A winding formed of foil having a coating of adhesive on one or both sides thereof, after the adhesive has been activated and solidified, is consolidated into a solid, integral structure whose dimensions are substantially stable. Thus, the stabilized winding may be cast in solid insulation without extensive preheating, normally resorted to for stabilizing purposes. Further, the adhesive stabilizes the dimensions of the windings more effectively than preheating, resulting in a more reliable winding structure which has far less propensity to cracking, during the casting of the solid insulation, and during the usage of the winding in its intended application. By using adhesive coating foil, the winding and casting procedures of the transformer may be greatly improved, eliminating several casting steps now required in the prior art.

BRIEF DESCRIPTION OF THE DRAWINGS

For a better understanding of the invention, reference may be had to the following detailed description, taken in connection with the accompanying drawings, in which:

FIG. 1 is a perspective view of a metallic foil conductor in section, illustrating an embodiment of the invention;

FIGS. 1A, 1B, 1C, 1D and 1E illustrate the steps of one method of forming the electrical conductor shown in FIG. 1;

FIG. 2 is a perspective view of an electrical coil which may be formed according to the teachings of the invention;

FIGS. 2A and 2B are fragmentary views, in section, of a portion of the electrical coil shown in FIG. 2;

FIGS. 3, 4, 5 and 6 are elevational views, in section, illustrating the steps of a method which may be used to construct an electrical transformer according to the teachings of the invention; and FIGS. 7, 8 and 9 are plan views, in section, illustrating the steps of another method which may be used to construct an electrical transformer according to the teachings of the invention.

DESCRIPTION OF PREFERRED EMBODIMENTS

Throughout the specification, the terms electrically conductive "strip," "sheet" or "foil" are intended to mean electrical conductors having a cross section in which the width dimension is large compared to the thickness dimension. For example, in electrical distribution type transformers it is common to use foil conductors having a thickness dimension in the range of .002 inch to .032 inch, and a width of a few inches to one or more feet, depending upon the electrical requirements of the coil to be formed from the foil conductor. Further, the term "strip or foil wound coil" as used in the specification generally means a coil formed by winding electrically conductive strip or foil flatwise upon itself to form a plurality of superposed or nested turns, with suitable electrically insulating means disposed between the turns in the form of a coating on the conductor, or a separate strip or sheet of insulating means, wherein the axial length of the coil is substantially equal to the width of the strip or foil, and each turn of the strip or foil forms a complete layer of the coil.

Insulated metallic strip or foil conductor, formed of copper or aluminum, is utilized in the manufacture of electrical transformers to form the electrical windings, which are subsequently cast in solid insulation. For example, it is common in transformers of the distribution type to form the low voltage windings of insulated metallic foil .008 to .032 inch thick and the high voltage windings of insulated metallic foil .002 to .008 inch thick. The metallic foil presents a manufacturing problem due to the growth of the coils formed of the foil during the various heating operations required in the casting of the windings with the solid insulation. The reasons for the growth of the foil wound coils are not entirely understood, but it is blieved that the major factor in the foil growth is the winding tension used during the winding of the coil, with other influencing factors being the volatiles evolved during subsequent heating of the coils and the different coefficients of the expansion of the metallic foil and the cast insulation. Attempts to stabilize the dimension of the foil wound coils by preheating for a predetermined period of time prior to the casting steps has not proven entirely satisfactory, as the foil wound coils continue to grow in dimension, even after preheat periods of 16 hours or more. Further, long preheat cycles are not desirable for high production coils, because of the added cost and additional manufacturing facilities required.

It has been found that foil wound coils may have their dimensions substantially stabilized by applying a thin coating of adhesive to the foil conductor, thus consolidating the coil into a solid or integral structure. The adhesive may be applied to the foil as it is being wound into a coil, thus forming a coherent solid structure upon curing of the adhesive, or the adhesive may be applied to the foil as the foil is being insulated, with the adhesive coating step being substituted for the final pass of the foil through the insulation coating mill. The latter approach is generally preferable, as the adhesive may be applied at substantially no increase in cost, and the total build of insulation plus adhesive can be controlled to be the same as the total build of the insulation on prior art foil. The insulation means may be any suitable wire type enamel such as the polyester system disclosed in copending application Ser. No. 347,694, filed Feb. 27, 1964, now U.S. Pat. No. 3,389,015, and assigned to same assignee as the present application.

The adhesive means should be of a type which will dry nontacky, and not cause bonding to other foil having the adhesive means disposed thereon, when stored at ambient temperatures. The adhesive should be heat reactive, thermosetting or thermoplastic, to allow it to flow slightly and set when wound into an electrical coil and heated to a predetermined temperature. If thermoplastic, the softening temperature should exceed the subsequent processing temperatures and the maximum operating temperature of the completed electrical apparatus. An example of a suitable thermosetting epoxy type adhesive is disclosed in copending application Ser. No. 259,260, filed Feb. 18, 1963, now abandoned, and assigned to the same assignee as the present application.

It is important to note that in foil having a coating of insulation thereon, that it would not be satisfactory to merely leave the insulation coating in the "B" stage, and cure it after winding into a coil, as the tensions present in the coil would cause "cut-through" of the insulation upon curing. It is, therefore, necessary to have a coating of cured insulation on at least one major surface of the foil before applying the adhesive, in the embodiment of the invention which uses coated insulation, to prevent the possibility of developing turn-to-turn short circuits.

If the turns of the electrical coil are to be film insulated, by a discrete continuous strip or film of electrical insulating material such as one of the polyesters, interleaved between the turns of the foil as it is wound into a coil, the adhesive may be applied directly to the metallic strip or foil, either prior to the winding of the coil, or during the winding process.

FIG. 1 illustrates an electrical strip or foil conductor 10 formed according to the teachings of one embodiment of the invention. The thickness of the electrical conductor 10 is shown enlarged out of proportion to its width for purposes of clarity. Electrical strip conductor 10 includes a metallic strip or foil 12, formed of a suitable electrical conductor such as copper or aluminum, coated with insulating means 14 and having an outer coating of adhesive means 16. The adhesive means 16 is shown coating both major sides and the edges of the electrical conductor 10, as in general, this is the most practical way of applying it. However, in certain embodiments of the invention, it is only necessary to coat one of the major sides of the electrical conductor 10 with the adhesive means.

In the embodiment shown in FIG. 1, the electrical conductor is insulated by a coating of insulating means 14. Thus, the adhesive means 16 may be applied at the time of applying the insulation. The insulation means 14 is generally deposited on the conductor 12 in a plurality of passes, such as five or six, in order to dry each layer without bubbles or air inclusions and build up the insulation to the required thickness. Therefore, it is only necessary to eliminate the last pass through the insulation coating mill and substitute a pass through the adhesive coating means.

One method of forming the foil conductor 10 shown in FIG. 1, is illustrated in FIGS. 1A, 1B, 1C, 1D and 1E. Specifically, FIG. 1A illustrates a foil conductor 11, in section, which may be of any commercially available width. The foil 11 is passed through an insulation mill a predetermined plurality of times in order to achieve a predetermined build of insulation means 13, as shown in FIG. 1B. Insulation means 13 may be any of the commerically available wire enamels, or any other suitable insulating means. The foil 11 is then slit to provide the desired widths for their intended application, such as the conductor widths 15, 17 and 19 shown in FIG. 1C. The outer edges of the coated foil 11 are also trimmed, as shown at 45 and 47. The exposed edges of conductor 11 are then etched, as shown in FIG. 1D, to remove a predetermined amount of the metal at the exposed edges and provide a slight groove or channel, such as the channels 21. Then, instead of coating the conductor widths 15, 17 and 19 with the same insulating means 13, to insulate the edges of the conductors by filling the channel 21, the conductors are passed through adhesive means to provide a predetermined build of adhesive 23, as shown in FIG. 1E, which provides the adhesive for stabilizing the dimensions of the coils formed from the conductors, and also electrically insulates the exposed edges of the conductors by filling the channels 21.

In addition to forming an electrical coil whose dimensions may be substantially stabilized prior to capsulation in solid insulation means, the adhesive overcoat provides additional advantages. For example, weak spots dielectrically in the insulation means, produced by knicks, abrasions, and other stresses and strains introduced during its manufacture, are healed by the slight flowing action of the adhesive upon consolidating the coil.

To illustrtae the dimensional stability of coils wound according to the teachings of the invention, five test coils were wound to substantially the shape shown in FIG. 2. Specifically, FIG. 2 illustrates an electrical coil 20 formed of a strip or foil conductor 22. The letter D in FIG. 2 indicates the depth of the coil 20, and corresponds to the width of the strip conductor 22, $W_O$ indicates the width of the coil, and $L_O$ indicates the coil length. The opening or window in the coil 20 for receiving a magnetic core has a length dimension indicated by $L_i$ and a width dimension indicated by $W_i$.

The five test coils were wound on cast solid epoxy resin cores to the dimensions in inches shown in Table I.

TABLE I

| Coil No. | A | B | C | D | E |
|---|---|---|---|---|---|
| $W_O$ | 5.295 | 5.300 | 5.260 | 5.005 | 5.075 |
| $L_O$ | 6.033 | 6.052 | 5.990 | 5.008 | 5.820 |
| D | 1.25 | 1.125 | 4.0 | 1.15 | 1.25 |
| $W_i$ | 4.0 | 4.0 | 4.0 | 4.0 | 4.0 |
| $L_i$ | 4.75 | 4.75 | 4.75 | 4.75 | 4.75 |
| Foil: | | | | | |
| Metal | Al | Al | Al | Al | Al |
| Turns | 100 | 130 | 119 | 81 | 77 |
| Thickness | .004 | .003 | .003 | .004 | .004 |

Coils A, B and C were formed of aluminum foil having a coating of insulation thereon having a total build of .00085 to .0011 inch. Coil D was formed of aluminum foil having a coating of insulation plus a coating of thermoplastic adhesive, for a total build of .0011 to .0020 inch. Coil E was formed of aluminum foil having a coating of insulation thereon plus a coating of thermosetting adhesive, for a total build of .0003 to .0005 inch. The thermoplastic adhesive was a synthetic rubber resin cement (Armstrong Adhesive 222), and the thermosetting adhesive was an unfilled epoxy resin system. The coils were aged in an oven at a temperature of 150° C. for a predetermined period of time and periodic measurements of the $W_O$ and $L_O$ dimensions were made. The growth or deviation in inches from the "as wound" dimensions appears in Table II.

TABLE II

| Hours | 24 | | 72 | | 168 | | 216 | | 336 | | 408 | | 504 | | 528 | |
|---|---|---|---|---|---|---|---|---|---|---|---|---|---|---|---|---|
| | $W_O$ | $L_O$ | $W_O$ | $L_O$ | $W_O$ | $L_O$ | $W_O$ | $L_O$ | $W_O$ | $L_O$ | $W_O$ | $L_O$ | $W_O$ | $L_O$ | $W_O$ | $L_O$ |
| Coil A | .016 | .031 | .063 | .063 | .094 | .094 | .109 | .109 | .125 | .123 | .125 | .125 | .125 | .125 | | |
| Coil B | .063 | .047 | .156 | .109 | .219 | .203 | .266 | .219 | .266 | .250 | .297 | .250 | .313 | .266 | | |
| Coil C | .156 | .187 | .328 | .328 | .546 | .546 | | | .828 | .750 | | | | | | |
| Coil D | .018 | .013 | .018 | .014 | .017 | .011 | .011 | .008 | | | .005 | 0 | | | .005 | 0 |
| Coil E | .038 | .037 | .039 | .035 | .034 | .035 | .031 | .031 | .029 | .027 | .029 | .027 | | | | |

The results in Table II clearly show that the coils D and E, constructed according to the teachings of the invention, exhibit substantially less growth during aging at an elevated temperature than coils A, B and C which were not consolidated with an adhesive prior to aging. It is significant to note that the growth of coils A, B and C is not only sufficient to be a possible source of cracking of the insulation in a solid insulation system, but that the coil growth continues in coil A, even after 216 hours, and in coils B and C to the end of the test, indicating that reasonable preheating periods of coils A, B and C would not stabilize their dimensions.

FIGS. 2A and 2B are fragmentary, cross-sectional views of the coil 20 illustrated in FIG. 2, taken between the lines 24 and 26, and constructed according to the teachings of two embodiments of the invention. FIG. 2A illustrates an embodiment wherein the conductive foil is coated with insulating means, such as an enamel, and adhesive means is disposed over the insulating means. More specifically, FIG. 2A illustrates a plurality of conductors or turns 28, 30 and 32, each having a coating of insulating means on each side thereof, such as insulating means 34 on electrical conductor 28, and each having a coating of adhesive means on each side thereof, such as adhesive means 36 on electrical conductor 32. The adhesive means 36 between electrical conductors 30 and 32 also includes the adhesive means on electrical conductor 30, as upon consolidation of the winding, the adhesive means is made tacky, allowing the adhesive means to flow slightly and set. Therefore, in the embodiment of the invention it is readily seen that it is only essential that the adhesive means be applied to one major side of the conductor.

FIG. 2B illustrates an embodiment of the invention wherein the individual turns 28, 30 and 32 of the coil 20 are insulated with a film type sheet insulator, such as one of the polyesters, which is interleaved with the foil as it is wound. In this embodiment, it is necessary that each major side of the conductor be coated with adhesive means, such as adhesive means 29 on conductor 30, in order to insure that each side of the film insulating means, such as insulating means 31 and 33, is firmly bonded to the foil turns.

A suitable method of constructing a transformer in which all of the windings are cast in solid insulation is shown in FIGS. 3, 4, 5 and 6. FIGS. 3, 4, 5 and 6 are elevational views, in section, of the successive steps of winding, consolidating, casting, winding, consolidating and casting, until all of the required windings are formed and cast into solid insulation. For example, as shown in FIG. 3, a first winding 40 is formed of electrically conductive sheet, strip or foil having insulation means disposed thereon and an outer coating of adhesive means, by winding upon an insulating form or tube 42 a predetermined number of turns 44. The foil is wound upon itself to form a winding 40 having an axial length substantially equal to the width of the foil. The insulating tube 42 may be formed of the same material which will be subsequently used to encapsulate the winding 40, or any other suitable insulating means. After the winding 40 is formed, it is heated to activate and cure the adhesive means, to consolidate the winding 40 and stabilize its dimensions. This consolidation heating cycle is substantially shorter than the preheat cycle used in prior art attempts to stabilize the dimensions of the conventional foil wound coils, being in the order of three hours compared with 16 hours.

After stabilizing the dimensions of coil 40, coil 40 is cast with solid insulating means 46, as shown in FIG. 4. The insulating means 46 may be formulated in accordance with the disclosure in the hereinbefore mentioned copending application Ser. No. 456,038, or any other suitable cast insulating means may be used. After the insulating means 46 is cured to a solid, a second winding 48 is wound thereon, as shown in FIG. 5, and the structure is subjected to a short heating cycle to stabilize the dimensions of winding 48. After winding 48 is stabilized, it is cast with solid insulating means 50 as shown in FIG. 6. This process is continued until the desired number of windings are formed. The stabilizing of the winding dimensions according to the teachings of the invention greatly reduces the chances of cracking the cast insulating means and actually allows the essential characteristics of the cast insulating means to be relaxed somewhat, as it will not be called upon to compensate for relatively large changes in winding dimensions without cracking.

The stabilization of the winding dimensions by the principles disclosed herein also makes it possible to eliminate casting steps required in the prior art, and thus reduce the cost of a cast foil wound transformer. FIGS. 7, 8 and 9 are plan views of steps in the manufacture of the transformer 60 which requires only one casting step.

More specifically, FIG. 7 illustrates a first coil or winding 62 formed of electrically conductive strip or foil, having a predetermined number of turns 64 superposed in nested insulating relation, and having electrical leads 66 and 68 suitably attached thereto. The turns 64 may have a strip or film of insulation between the turns, in which event the adhesive means is applied directly to the metallic foil, prior to the winding of coil 62 or during the winding, or the foil may have a coating of insulating means disposed thereon, and a coating of adhesive means on at least one major surface or side, applied directly after the insulating means is applied, or while the coil 62 is being wound. The coil 62 is then heated in suitable heating means for a predetermined period of time to cure the adhesive means and stabilize the dimensions of the coil.

In like manner, FIG. 8 illustrates a second coil or winding 70, formed in the same manner as the coil 62 shown in FIG. 7, and having electrical leads 72 and 74. Coil 70 has its dimensions stabilized in the same manner as coil 62 and it may be disposed in the heating means with coil 62, thus greatly decreasing the manufacturing time over the progressive winding method shown in FIGS. 3, 4, 5 and 6.

After coils 62 and 70 are wound and stabilized, they are concentrically disposed in a suitable mold, and cast solid insulation 80 introduced to form the insulation between the coils 62 and 70, and to ground, as shown in FIG. 9. After the insulation 80 is cast around the coils 62 and 70, the transformer 60 is read to receive magnetic core means 82, shown in dotted outline. Without the degree of dimensional stability of windings 62 and 70 achievable by utilizing the teachings disclosed herein, a transformer constructed according to the steps shown in FIGS. 7, 8 and 9 would be highly susceptible to cracks, especially in the insulating means disposed between the windings 62 and 70.

In summary, there has been disclosed a new and improved transformer arrangement having foil wound windings cast in solid insulation. Transformers constructed according to the teachings of the invention are more reliable due to the substantial elimination of winding growth as the cause of cracking the solid insulation, and they are less costly to manufacture due to the elimination of the extensive preheating of the windings required in the prior art in an effort to stabilize the winding dimensions, and due to the reduction in manufacturing steps and simplified manufacturing procedures which may be adopted in view of the stabilized winding structures.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in a limiting sense.

We claim as our invention:

1. A method of constructing an electrical transformer comprising the steps of:
   coating at least one side of a first electrically conductive strip material with adhesive means,
   winding said adhesive coated first electrically conductive strip material to form a first electrical coil having predetermined dimensions,
   curing the adhesive on said first electrical coil to consolidate said coil and stabilize its dimensions.
   casting said stabilized first coil in castable electrical insulating means,
   curing the castable electrical insulating means on said stabilized first coil,
   coating at least one side of a second electrically conductive strip material with adhesive means,
   winding said adhesive coated second electrically conductive strip material about said cast first electrical coil to form a second electrical coil having predetermined dimensions, and
   curing the adhesive means on said second electrical coil to consolidate said coil and stabilize its dimensions.

2. The method of claim 1 including the steps of casting said stabilized second electrical coil in castable electrical insulating means, and curing the castable electrical insulating means on said stabilized second coil.

3. The method of claim 1 wherein the steps of coating said first and second electrically conductive strip materials are performed during the steps of winding said first and second electrically conductive strip materials into said first and second electrical coils.

4. The method of claim 1 including the steps of drying said adhesive means after the steps of coating said first and second electrically conductive strip materials with said adhesive means.

5. The method of claim 1 including the steps of applying a coating of electrical insulating means on said first and second electrically conductive strip materials prior to the steps of coating the first and second electrically conductive strip materials with said adhesive means.

6. The method of claim 1 wherein the steps of coating said first and second electrically conductive strip materials with said adhesive means coats both sides of said first and second electrically conductive strip materials, and wherein the steps of winding the first and second electrically conductive strip materials includes introducing a strip of electrical insulation to separate and insulate the respective turns of said first and second electrical coils.

7. The method of claim 1 wherein the steps of coating said first and second electrically conductive strip materials with said adhesive means includes the steps of cutting said first and second electrically conductive strip materials from strips of electrically conductive material which have been coated with electrical insulation, and etching the cut strips to remove a predetermined amount of exposed electrical conductor at their cut edges.

8. The method of claim 7 including the step of drying said adhesive means prior to the winding steps.

References Cited

UNITED STATES PATENTS

| | | | |
|---|---|---|---|
| 2,656,290 | 10/1953 | Berberich et al. | 336—206X |
| 3,201,728 | 8/1965 | McWhirter | 336—205X |
| 3,237,136 | 2/1966 | Ford | 336—206X |
| 3,274,320 | 9/1966 | Reber | 29—605 |
| 3,378,801 | 4/1968 | Smith | 336—206 |
| 3,412,354 | 11/1968 | Sattler | 336—205 |
| 3,436,704 | 4/1969 | Keto et al. | 29—605X |

JOHN F. CAMPBELL, Primary Examiner

C. E. HALL, Assistant Examiner

U.S. Cl. X.R.

29—602; 174—120; 336—96, 205, 206